US011355006B1

(12) United States Patent
Cho et al.

(10) Patent No.: US 11,355,006 B1
(45) Date of Patent: Jun. 7, 2022

(54) CROSSWALK SYSTEM AND ELECTRONIC DEVICE FOR PROVIDING INDICATION AROUND CROSSWALK

(71) Applicant: KOREA AUTOMOTIVE TECHNOLOGY INSTITUTE, Cheonan-si (KR)

(72) Inventors: Hyun Woo Cho, Cheonan-si (KR); Ho Joon Kang, Cheonan-si (KR); Tae Lim Kim, Cheonan-si (KR); Seong-Jin Kwon, Cheonan-si (KR); Seok-San Shin, Cheonan-si (KR); Ju Yeon Hwang, Cheonan-si (KR)

(73) Assignee: KOREA AUTOMOTIVE TECHNOLOGY INSTITUTE, Cheonan-si (KR)

( * ) Notice: Subject to any disclaimer, the term of this patent is extended or adjusted under 35 U.S.C. 154(b) by 0 days.

(21) Appl. No.: 17/400,235

(22) Filed: Aug. 12, 2021

(30) Foreign Application Priority Data

Jul. 23, 2021 (KR) .......................... 10-2021-0097250

(51) Int. Cl.
*G08G 1/005* (2006.01)
*H04W 4/44* (2018.01)
*G08G 1/095* (2006.01)
*G08G 1/16* (2006.01)
*G08G 1/01* (2006.01)

(52) U.S. Cl.
CPC ........... *G08G 1/005* (2013.01); *G08G 1/0116* (2013.01); *G08G 1/095* (2013.01); *G08G 1/166* (2013.01); *H04W 4/44* (2018.02)

(58) Field of Classification Search
None
See application file for complete search history.

(56) References Cited

U.S. PATENT DOCUMENTS

| 2005/0270175 | A1* | 12/2005 | Peddie | G08G 1/096783 246/473 R |
|---|---|---|---|---|
| 2017/0301268 | A1* | 10/2017 | Laforce | G09F 9/302 |
| 2019/0287403 | A1* | 9/2019 | Aoude | G08G 1/017 |
| 2020/0265719 | A1* | 8/2020 | Swan | G08G 1/166 |

* cited by examiner

*Primary Examiner* — John F Mortell
(74) *Attorney, Agent, or Firm* — WHDA, LLP

(57) ABSTRACT

Disclosed is a crosswalk system according to various embodiments comprising an infrastructure including a communication device, a vehicle communicating with the infrastructure, and an indicating device electrically connected to the infrastructure. The infrastructure may detect an external object within a predetermined area through at least one sensor, obtain a location of the vehicle through the communication device, and based on the detected external object and the obtained position of the vehicle, transmit to the indicating device a signal requesting provision of information related to whether it is possible to cross the predetermined area from the external object or the vehicle. Other various embodiment may be implemented.

10 Claims, 9 Drawing Sheets

CROSSWALK SYSTEM AND ELECTRONIC DEVICE FOR PROVIDING INDICATION AROUND CROSSWALK

CROSS-REFERENCE TO RELATED APPLICATION(S)

This application claims the benefit under 35 U.S.C. § 119(a) of a Korean patent application filed in the Republic of Korea Intellectual Property Office on Jul. 23, 2021 and assigned Serial No. 10-2021-0097250, the entire disclosure of which is incorporated herein by reference.

TECHNICAL FIELD

The present disclosure relates to a crosswalk system and an electronic device for providing indication around the crosswalk.

BACKGROUND

A traffic light that gives a traffic indication around a crosswalk may provide traffic signal status information to enhance safety for users using or traversing the crosswalk. The traffic light may typically provide the users and vehicle drivers with such traffic signal status information in accordance with a predetermined cycle.

Traffic accidents between pedestrians walking on a crosswalk and vehicles traveling across the crosswalk occur frequently. In order to reduce such accidents between pedestrians and vehicles, a method for notifying the pedestrians of approaching vehicles or a method of controlling the speed of the vehicle approaching the crosswalk will be required.

The technical problems to be solved according to the present disclosure are not limited to those technical problems mentioned above, and other technical problems not yet mentioned will be clearly understood to those skilled in the art to which the present invention belongs from the following description.

SUMMARY

According to various embodiments, there is provided a crosswalk system comprising an infrastructure including a communication device, a vehicle communicating with the infrastructure, and an indicating device electrically connected to the infrastructure, wherein the infrastructure may be configured to detect an external object within a predetermined area through at least one sensor, obtain a location of the vehicle through the communication device, and, based on the detected external object and the obtained position of the vehicle, transmit to the indicating device a signal requesting provision of information related to whether it is possible to cross the predetermined area from the vehicle.

According to various embodiments, there is provided an electronic device comprising a communication device, at least one memory configured to store a plurality of instructions, at least one sensor to detect an external object, and at least one processor operatively coupled to the communication device, the at least one memory and the at least one sensor, wherein the at least one processor, when the instructions are executed, may be configured to receive information from a vehicle entering a predetermined area through the communication device, while a traffic light disposed in the predetermined area including a crosswalk outputs a pedestrian signal, identify a distance between the predetermined area and the vehicle based on the received information, transmit to the vehicle a vehicle control signal for controlling a driving state of the vehicle through the communication device based on the identified distance, and transmit a control signal to an indicating device disposed in the crosswalk, through the communication device, so that the vehicle and the pedestrians using the crosswalk are provided with indication information, based on the identified distance.

The crosswalk system and the electronic device for providing an indication around a crosswalk according to various embodiments of the present disclosure make it possible to ensure the safety of the pedestrians or vehicles using or entering the crosswalk, by recognizing the surrounding situation around the crosswalk to provide the indication information to the pedestrian or the vehicle using the crosswalk.

Effects and advantages accruing from the present disclosure are not limited to the foregoing, and those skilled in the art to which the present invention belongs can apparently envisage other effects and advantages not mentioned therein, from the following description presented only by way of an example.

BRIEF DESCRIPTION OF THE DRAWINGS

The above and other objects, features, and advantages of the present invention will be more clearly understood from the following detailed description, taken in conjunction with the accompanying drawings, in which.

DETAILED DESCRIPTION

Figure 1:
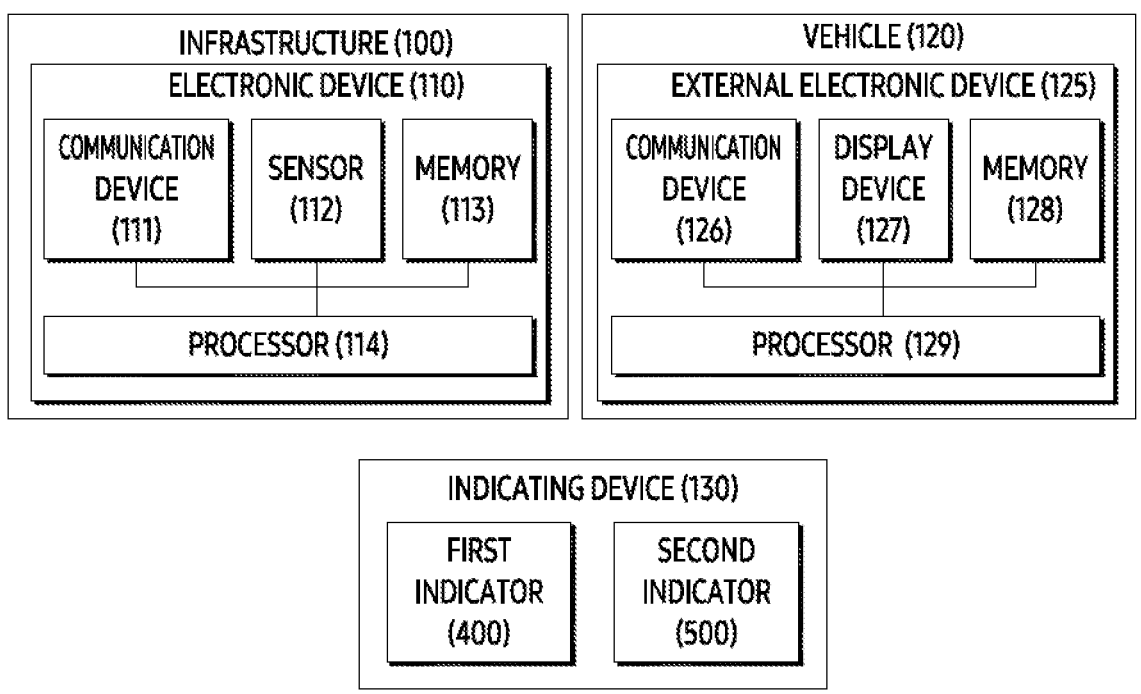
FIG. 1 shows a block diagram composing a crosswalk system, according to an exemplary embodiment.

Specific structural or functional descriptions of various embodiments according to the concept of the present invention disclosed throughout this specification are only illustrated for the purpose of describing the embodiments according to the concept of the present invention, and those embodiments may be embodied in various forms and are not intended to be limited to the embodiments described herein.

Since the embodiments according to the concept of the present invention may be made with various changes or modifications and may have various forms, the embodiments will be illustrated with reference to the drawings and described in detail herein. However, this is not intended to limit the embodiments according to the concept of the present invention only to the specific details disclosed herein, and may include any changes, equivalents, or substitutes included within the spirit and scope of the present invention.

Although terms such as e.g., 'first' or 'second' may be used to describe various elements, the elements should not be limited by those terms. The above terms are used only for the purpose of distinguishing one element from other elements, for example, a first element may be referred to as a second element, and likewise, a second element may be referred to as a first element, without departing from the scope of protection according to the concept of the present invention.

When an element is referred to as being 'connected' or 'coupled' to/with another element, it may be directly connected or coupled to/with another element, but other element(s) may be intervened in between them. On the other hand, it should be construed that, when it is mentioned that a certain element is 'directly connected' or 'directly coupled' to another element, there is no other element in between them. Some expressions describing the relationship between two or more elements, such as for example, 'between', 'immediately between' or 'directly adjacent to' or the like should be construed likewise.

The terms used herein are used only to describe certain embodiments, and are not intended to limit the scope of the present invention. Any singular expression may include the plural expression unless the context clearly dictates otherwise. Throughout the present disclosure, the terms such as e.g., 'comprise', 'include' or 'have' are intended to designate that the described feature, number, step, operation, element, component, part, or a combination thereof exists, and it should be understood that they do not preclude in advance any possibility of the presence or addition of one or more other features, numbers, steps, operations, elements, components, parts, or combinations thereof.

Unless defined otherwise, all those terms used herein, including technical or scientific ones, may have the same meaning as commonly understood by one of ordinary skill in the art to which the present invention belongs. Terms such as those defined in a commonly used dictionary should be interpreted as having a meaning consistent with the meaning in the context of the related art, and do not be interpreted in an ideal or excessively formal meaning unless explicitly defined herein.

Hereinafter, various exemplary embodiments will be described in detail with reference to the accompanying drawings. However, it should be appreciated that the scope of the present invention is not limited or restricted only by these embodiments. Like reference numerals in each figure indicate like elements.

FIG. 1 shows a schematic block diagram for a crosswalk system 10 according to an embodiment.

Referring to FIG. 1, the crosswalk system 10 may include at least one of an infrastructure 100, a vehicle 120, or an indicating device 130.

The crosswalk system 10 may be configured to provide communications between the infrastructure 100, the vehicle 120 and the indicating device 130. The crosswalk system 10 may determine information to be provided to any other entities as required, based on a current position/location of a pedestrian and a current position/location of a vehicle. For example, the crosswalk system 10 may provide the information to a pedestrian/pedestrians located on the crosswalk and/or a vehicle/vehicles approaching or entering the crosswalk, through the indicating device 130. According to an embodiment, such information may include visual information and/or audio information that may be provided for the safety of pedestrians walking on the crosswalk.

The infrastructure 100 may include an electronic device 110 capable of detecting any surroundings of the infrastructure 100 to transmit and receive signals to and from an external electronic device 125 and/or the indicating device 130, and one or more traffic lights (not shown).

The infrastructure 100 may be configured to transmit display information on whether an autonomous vehicle recognizes a pedestrian/pedestrians to a display device (not shown) or the indicating device 130.

According to an embodiment, the electronic device 110 may include at least one of a communication device 111, at least one sensor 112, a memory 113, or a processor 114, although not limited thereto.

According to an embodiment, the communication device 111 may be configured to establish communication connection between the infrastructure 100 and any external electronic device. For example, the communication device 111 may be configured to establish a communication channel for vehicle-to-infrastructure (V2I) communication between the infrastructure 100 and the vehicle 120. As another example, the communication device 111 may be configured to establish a communication channel for infrastructure-to-infrastructure (121) communication with the infrastructure 100 and another infrastructure. According to one embodiment, the communication device 111 may be operatively coupled to the processor 114.

According to an embodiment, the communication device 111 may be configured to receive various information inclusive of e.g., driving information, position information, and/or an arrival time of the vehicle 120, from the vehicle 120. The communication device 110 may transmit the received information to the processor 114.

According to an embodiment, the communication device 111 may be configured to receive certain surrounding traffic information such as e.g., a flow of vehicles and an average speed of a vehicle, through communication with another infrastructure that is distinguishable from the infrastructure 100. The communication device 111 may transmit the received information to the processor 114.

According to an embodiment, the sensor 112 may include an ultrasonic sensor, an optical input device such as a camera, a radar and/or a LIDAR. The sensor 112 according to an embodiment is not limited to the above-described sensor or devices. According to an embodiment, the sensor 112 may be configured to detect or identify an external object or vehicle, and then transmit the detected result to the processor 114. According to one embodiment, the sensor 112 may be operatively coupled with the processor 114.

According to one embodiment, the memory 113 may store various data to be used by at least one element of the infrastructure 100, such as e.g., the communication device 111, the sensor 112 and/or the processor 114. A variety of data can be stored. The data may include a set of software or input/output data for execution of its associated instructions. For example, the memory 113 may include at least one hardware component for storing data and/or instructions input and/or output to the processor 114. The memory 113 may include, for example, volatile memories such as random-access memory (RAM) and/or non-volatile memories such as read-only memory (ROM). The volatile memories may include, for example, at least one of a dynamic RAM (DRAM), a static RAM (SRAM), a cache RAM, and a pseudo SRAM (PSRAM). According to one embodiment, the memory 113 may be operatively coupled to the processor 114.

According to an embodiment, the memory 113 may store vehicle driving information received by the processor 114, surrounding traffic information, and/or information processed by the processor 114 based on the above information. The memory 113 may store therein algorithms for calculating the processing information of the processor 114, such as for example, a time for the vehicle 120 to arrive at the position where the infrastructure 100 is located, a distance to the crosswalk, a time duration required for transmission/reception of the information, and/or the like, although the information is not limited thereto.

According to one embodiment, the processor 114 may be either electrically or operably/operatively coupled with or connected to the elements of the infrastructure 100, such as e.g., the communication device 111, the sensor 112, and the memory 113. The processor 114 may control the overall operation of the electronic device 110. In one embodiment, the processor 114 may include one processor core (single core) or a plurality of processor cores. For example, the processor 114 may include a multi-core such as e.g., a dual-core, a quad-core, a hexa-core or the like. According to various embodiments, the processor may further include a cache memory located inside or outside the memory.

According to one embodiment, the processor 114 may store, as at least part of the data processing or operation, instructions or data received from other element (such as, e.g., the communication device 111) into a volatile memory, process the instructions or data stored in the volatile memory, and store the resulting data into a non-volatile memory.

According to one embodiment, the processor 114 may process information received from the communication device 111, the sensor 112, and/or the memory 113, and then provide a request for controlling the vehicle 120 and/or the indicating device 130 to the vehicle 120 and/or the indicating device 130 through the communication device 111.

According to an embodiment, the processor 114 may be configured to establish a communication channel with the communication device 126 of the vehicle 120 through the communication device 111. The processor 114 may be configured to receive various information (such as, e.g., driving information, position information, and/or arrival time) of the vehicle 120 from the vehicle 120 through the established communication channel. According to an embodiment, the processor 114 may be configured to receive traffic signal status information from at least one traffic light (or a pedestrian signal light) of the infrastructure 100. According to an embodiment, the processor 114 may receive information related to the position or location of an external object and an adjacent vehicle from the sensor 112. According to an embodiment, the processor 114 may store the received information into a memory. The processor 114 may determine a time duration for a vehicle to get to a crosswalk and/or whether or not a pedestrian is allowed to walk on the crosswalk, based on the received information. The processor 114 may transmit to the vehicle 120 a signal for speed control of the vehicle 120 through the communication device 111, based on the determination.

According to an embodiment, the vehicle 120 may be a moving entity travelling on a road. The vehicle 120 may communicate with the infrastructure 100 or a server managing information related to the vehicle 120, through an external electronic device 125 arranged (or installed) within the vehicle 120. The vehicle 120 may provide driving information, position information, and/or arrival time information of the vehicle 120 to the infrastructure 100 or the server, by means of the communication. According to an embodiment, the vehicle 120 may be an autonomous vehicle that may be controlled by the external electronic device 125 including the processor 129 without intervention by any user input, although the present invention is not limited thereto. For example, the vehicle 120 may be either a vehicle controlled by a driver or user's input, or a vehicle controlled based on the user's inputs and information determined through the processor 129 from the surrounding situation.

According to an embodiment, the vehicle 120 may include at least one of a communication device 126, a display device 127, a memory 128, or a processor 129. According to one embodiment, the processor 129 may be operatively coupled to at least one of the communication device 126, the display device 127, or the memory 128.

According to an embodiment, the communication device 126 may be configured to establish a communication channel with the communication device 111 of the electronic device 110. The communication device 126 may transmit or receive information to or from the communication device 111 through the established communication channel. According to an embodiment, the communication device 126 may support vehicle-to-infrastructure (V2I) communication. The vehicle 120 may transmit its driving information to the infrastructure 100 through the V2I communication. Based on the driving information, the infrastructure 100 may analyze behavior information on the vehicle entering the crosswalk. The infrastructure 100 may receive various driving information (such as, e.g., information on the vehicle movement, location, speed, activation of an autonomous driving system or the like) from the vehicle 120.

According to an embodiment, the display device 127 may be disposed outside the vehicle 120. For example, the display device 127 may be disposed or installed on at least a partial area of a bonnet of the vehicle, although not limited thereto. For example, the display device 127 may be disposed or installed on at least a partial area of a bumper of the vehicle.

According to an embodiment, the display device 127 may display information related to whether an external object is recognized based on information received from the electronic device 110. For example, the display device 127 may output first information indicating that the processor 129 recognizes a pedestrian walking on a crosswalk or second information indicating that the processor 129 does not recognize any pedestrian walking on the crosswalk. According to an embodiment, the first information may include text information such as e.g., 'successful pedestrian recognition' and/or image information such as e.g., an emoticon (for instance, a human-shaped or smiley-shaped emoticon, or the like). According to an embodiment, the second information may include text information such as e.g., 'pedestrian recognition failure'. According to an embodiment, the external electronic device 125 may further include an audio device (not shown) for outputting auditory information. In such a case, the audio device may generate auditory information corresponding to the visual information output from the display device 127. For example, when the first information is output from the display device 127, the audio device may generate audio signal indicative of the successful pedestrian recognition. As another example, when the second information is output from the display device 127, the audio device may generate audio signal indicative of the pedestrian recognition failure.

According to an embodiment, the memory 128 may store information processed by the processor 129, based on information received through the communication device 126. The memory 128 may include information related to the first information or the second information to be displayed on the display device 127 based on the processed information.

According to an embodiment, the processor 129 may process information obtained from at least one of the communication device 126, the display device 127, or the memory 128, and control the communication device 126 and/or the display device 127 based on the processed information. The processor 129 may make a speed control of the vehicle 120, based on a sequence of signals received from the electronic device 110 through the communication device 126. The processor 129 may provide one or more of driving information (e.g., speed) of the vehicle 120, position information of the vehicle 120, or arrival time information to arrive at the crosswalk installed with a traffic light having the electronic device 110, via the communication device 126, to the electronic device 110. The processor 129 may provide visual or auditory information to its outside through the display device 127 or an audio device (not shown) of the vehicle 120.

According to an embodiment, the indicating device 130 may include a first indicator 400 and a second indicator 500. The indicating device 130 may communicate with the electronic device 110 by wired or wireless communication. In FIG. 1, although the indicating device 130 is described as a separate device distinct from the electronic device 110, the indicating device 130 may be included in the electronic device 110. For example, the indicating device 130 may be operatively connected to the processor 114 of the electronic device 110. The processor 114 may control the operation of the indicating device 130.

According to an embodiment, the first indicator 400 may include a plurality of light emitting units and a plurality of light receiving units. The first indicator 400 may output various sources of lights (such as, e.g., laser, LED, and/or halogen) through the plurality of light emitting units toward the plurality of light receiving units. The first indicator 400 may be located or installed, for example, on one side of the road abutting on a crosswalk in which the crosswalk system 10 is installed, or may be installed as a pair on the road facing the crosswalk. However, the location to install the first indicator is not limited thereto.

According to an embodiment, the first indicator 400 may be configured to function on the basis of a control signal received from the electronic device 110. For example, when a traffic light (or a pedestrian traffic light) of a crosswalk is turned on in green, the first indicator 400 may output a screen wall based on the control signal of the electronic device 110. The first indicator 400 may further include a processor to control the plurality of light emitting units and/or light receiving units.

According to an embodiment, the second indicator 500 may include a plurality of indicator lamps. According to an embodiment, the indicator lamps may include a plurality of light emitting diodes (LEDs). The electronic device 110 may generate a control signal to control the second indicator 500 based on at least one of traffic signal status information, information on the vehicle 120, or information on an external object, and provide the generated control signal to the second indicator 500. The second indicator 500 may be installed or embedded on a floor surface of the crosswalk (or road) to provide light recognizable by an external object (e.g., a pedestrian). For example, the second indicator 500 may provide the pedestrian(s) with indication information by controlling the lighting color (e.g., green or red) of the plurality of LEDs based on at least one of whether the vehicle 120 can be stopped, whether a pedestrian is walking on the crosswalk, or the remaining time information of the traffic light.

As described above, the crosswalk system 10 makes it possible to provide a pedestrian(s) entering a crosswalk with indication information, based on at least one of the presence or absence of the vehicle 120 or the pedestrian(s) entering the crosswalk, or traffic signal status information, so as to prevent occurrence of any dangerous traffic accident that might be caused by the vehicle 120 entering the crosswalk.

Figure 2:
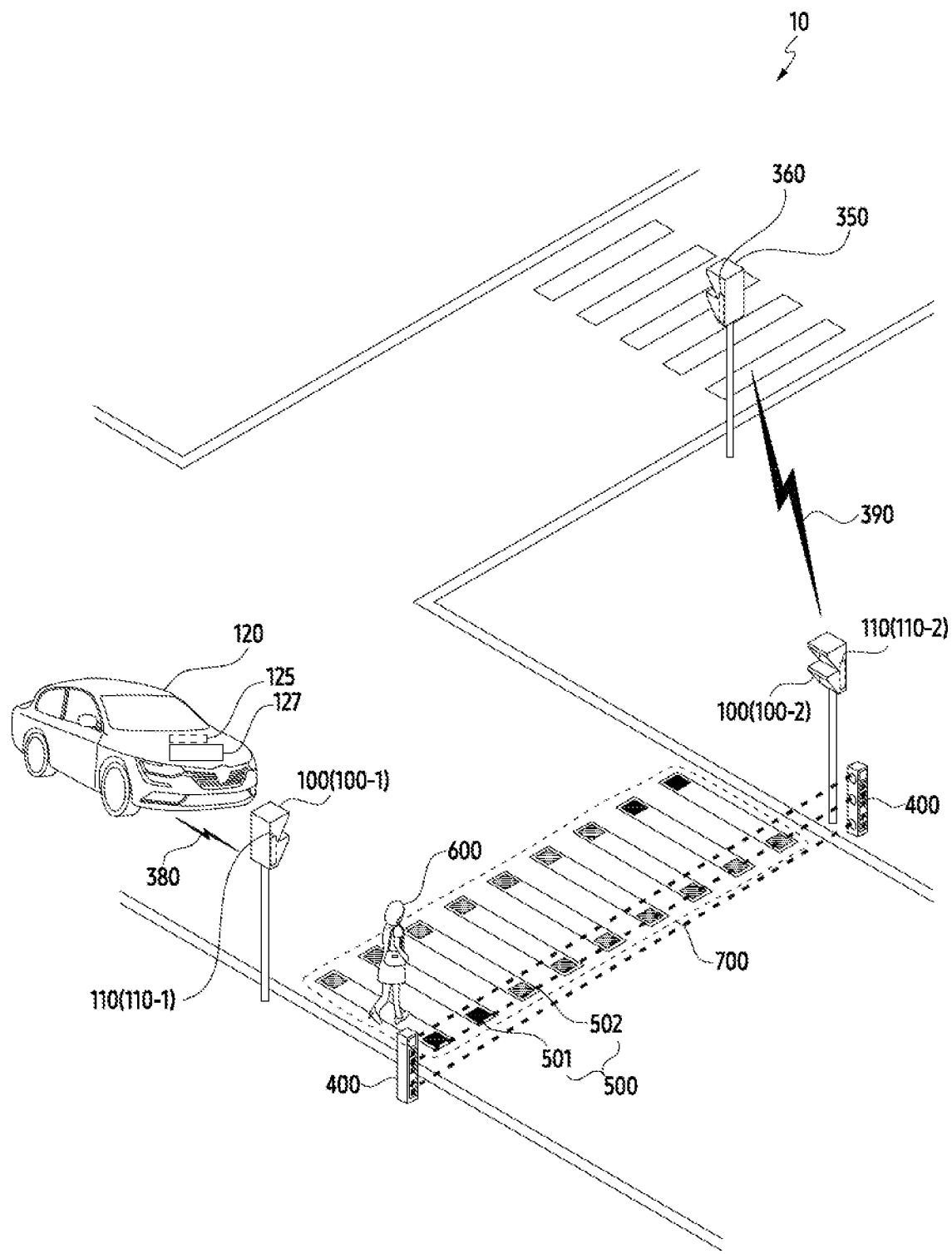
FIG. 2 shows a schematic diagram of a crosswalk system according to an exemplary embodiment.

FIG. 2 shows a schematic diagram of a crosswalk system according to one embodiment.

Referring now to FIG. 2, the infrastructure 100 may provide another infrastructure 350 with traffic signal status information of a traffic light equipped in the infrastructure 100, through 121 communication. The traffic signal status information may include green, yellow or red signal information provided by the traffic light, and a remaining time duration up until a next shift of the traffic signal light (or countdown information on the time of signal change).

The electronic device 110 may be configured to transmit/receive information to and from the vehicle 120 and/or another infrastructure, via the communication device 111. Based on the transmitted/received information, the electronic device 110 may transmit a control signal to the vehicle 120 and/or the indicating device 130. The electronic device 110 (e.g., the electronic device 110 of FIG. 1) may be entirely located within the infrastructure 100 (e.g., the infrastructure 100 of FIG. 1) to which the crosswalk system 10 is applied, or at least some of the electronic device 110 may be exposed to the outside. For example, the sensor 112 of the electronic device 110 (e.g., the sensor 112 of FIG. 1) may be disposed exposed to the outside of the infrastructure 100 to detect an external object 600 or a vehicle 120 entering the crosswalk. The infrastructure 100 may include a traffic light, a traffic monitoring camera, and/or a traffic information collecting camera. The infrastructure 100 may be disposed or installed across the crosswalk to which the crosswalk system 10 (e.g., the crosswalk system 10 of FIG. 1) is applied. In case where the infrastructure 100 is of a traffic light for pedestrians, the infrastructure 100 may be disposed at a position where pedestrians can easily identify it. The infrastructure 100 may be located on the rightmost side as a user (e.g., pedestrian) across the crosswalk looks at it, so that it can be easily and conveniently identified even when the vehicle is already entering the crosswalk. However, the location of the infrastructure 100 is not limited thereto. The infrastructure 100 may be configured to perform 121 communication 390 with another electronic device 360 disposed in the infrastructure 350, other than the traffic light to which the present system is applied.

According to an embodiment, the vehicle 120 (e.g., the vehicle 120 of FIG. 1) may include an external electronic device 125 (e.g., the external electronic device 125 of FIG. 1) mounted on the vehicle 120. The external electronic device 125 may be configured to transmit information (e.g., driving information, position information, arrival time information) of the vehicle 120 to the electronic device 110 included in the infrastructure 100, via the communication device 126 (e.g., the communication device 126 of FIG. 1). The infrastructure 100 may perform V2I communication 380 with the vehicle 120 equipped with the external electronic device 125, through the communication device 111 (e.g., the communication device 111 of FIG. 1).

According to an embodiment, the external electronic device 125 may include a display device 127. The display device 127 may be installed in at least part of a bonnet of the vehicle 120 (or at least a partial area of the bumper) to display visual or audio information on whether or not a pedestrian is recognized.

According to an embodiment, the first indicator 400 (e.g., the indicating device 400 of FIG. 1) may provide indication information so that the vehicle 120 entering the crosswalk can recognize the crosswalk. For example, the first indicator 400 may output a screen wall recognizable by the vehicle 120, using a laser, an LED, or a halogen lamp. Then, the vehicle 120 entering the crosswalk may identify the crosswalk by identifying the screen wall output by the first indicator 400 to recognize the crosswalk based on information received from the electronic device 110.

According to an embodiment, the first indicator 400 including a plurality of light emitting units and a plurality of light receiving units may be disposed at or around a vertex of a predetermined area 700. A structure having the plurality of light emitting units may be disposed at one edge of the predetermined area 700, and a structure having the plurality of light receiving units may be disposed at or around one of the remaining vertices of the predetermined area 700. The structure having the plurality of light emitting units and the structure having the plurality of light receiving units may be disposed at or around both ends of one edge of the predetermined area 700. Each of the plurality of light emitting units and each the plurality of light receiving units may be disposed on both sides of the crosswalk. For example, the plurality of light emitting units may be disposed on one of the sidewalks abutting on the roadway crossed by the crosswalk, and the plurality of light receiving units may be disposed on the other of the sidewalks abutting on the roadway crossed by the crosswalk. According to one embodiment, the predetermined area 700 may include the crosswalk and/or a second indicator 500, although not limited thereto.

According to an embodiment, the plurality of light emitting units included in the first indicator 400 may direct light toward the plurality of light receiving units, in response to a request (or an instruction or signal) received from the electronic device 110. The plurality of light emitting units and the plurality of light receiving units may form a screen wall with a laser. Although it is not limited thereto, the plurality of light receiving units may further include one or more light emitting units, and the screen wall may be visually represented by means of implementing a hologram or the like with interference of light emitted from each of the light emitting units. The processor 129 of the vehicle 120 may recognize the screen wall and control the driving condition (such as, e.g., braking or deceleration) for the vehicle 120, based on the recognition of the screen wall. The first indicator 400 may form the screen wall, in response to receiving a signal requesting to form the screen wall from the electronic device 110. When the electronic device 110 identifies that a distance between the vehicle 120 and the crosswalk is less than or equal to a first distance d1, or the traffic light turns on in green, the electronic device 110 may then provide a signal requesting the first indicator 400 to form the screen wall.

According to an embodiment, the second indicator 500 (e.g., the indicating device 500 of FIG. 1) may provide an external object 600 with indication information to determine whether the external object 600 (e.g., a pedestrian) approaching or entering the crosswalk is allowed to cross it. For example, the second indicator 500 may provide indication information to the external object 600, in response to a control signal to control the lighting state of a plurality of LEDs included in the second indicator 500, based on at least one of the information (e.g., driving information, position information, and/or arrival time information) of the vehicle 120 received from the electronic device 110, the presence of the external object 600 using a crosswalk, or the traffic signal status information. According to an embodiment, when the processor 114 identifies that the traffic light is turned on in green based on the traffic signal status information of the traffic light, it may determine whether the vehicle can be stopped before the vehicle 120 enters the crosswalk, based on the information received from the vehicle 120. Based on the determination, the processor 114 may transmit to the second indicator 500 a request for controlling the plurality of LEDs to turn on in red, if it is determined that the vehicle 120 cannot be stopped before entering the crosswalk. The second indicator 500 may turn on the plurality of LEDs in red, in response to receiving from the processor 114 the request for controlling the LEDs to turn on in red.

According to one embodiment, if it is determined that the vehicle 120 can be stopped before entering the crosswalk, then the processor 114 may control the indicator 500 to display at least some of the LEDs 502 in green and display the remaining LEDs 501 in red, based on the remaining time of the current traffic lighting of the traffic signal status information, so that the pedestrian crossing the crosswalk can be immediately guided to a safer walking zone. For example, the second indicator 500 may display the LEDs in green light, being arranged in the safe walking zone toward a distal end of the crosswalk, based on the remaining shift time of the traffic light, and then display the LEDs in red light, being arranged in the remaining position of the LEDs. According to one embodiment, the plurality of LEDs included in the second indicator 500 may include a plurality of first LEDs arranged around the left side of the crosswalk and a plurality of second LEDs arranged around the right side of the crosswalk. If it is determined that the vehicle 120 can be stopped before entering the crosswalk, then the processor 114 may control the second indicator 500 to display green light on some of the first LEDs while display red light on the other of the first LEDs, in order to provide the pedestrian(s) with safer guidance information. The second indicator 500 may provide the colors of the second LEDs corresponding to the colors of the first LEDs. For example, the first LEDs may refer to LEDs located on the right side of the external object 600, that is, a pedestrian, while the second LEDs may refer to LEDs located on the left side of the external object 600, and vice versa. The first LEDs may turn on the first two LEDs in red, viewed from the starting point of the crosswalk along the walking direction, and then turn on the remaining LEDs in green. Likewise, the second LEDs may turn on the first two LEDs in red, viewed from the starting point of the opposing crosswalk along the opposite direction of the walking direction of the external object 600, and then turn on the remaining LEDs in green.

As described above, the crosswalk system 10 makes it possible to guide a safer walking zone to a pedestrian who enters or walk on a crosswalk, by providing the indication information to the pedestrian. Accordingly, the crosswalk system 10 can assist in preventing a traffic accident that might be caused by a malfunction of an autonomous vehicle or a careless driving of a vehicle driver.

Figure 3:
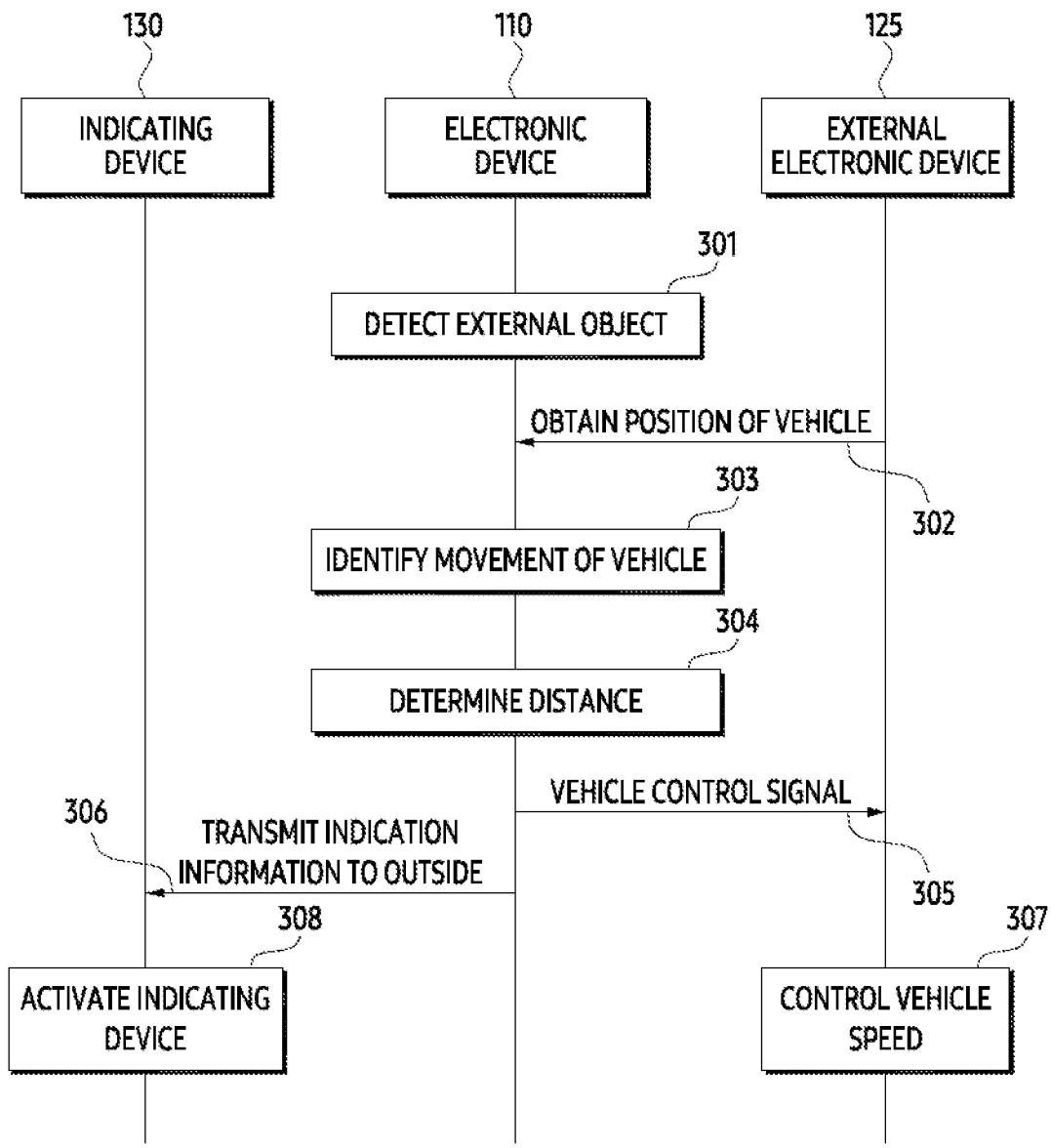
FIG. 3 is a flowchart for a signal transmission/reception operation between various devices composing a crosswalk system according to an exemplary embodiment.
Figure 4:
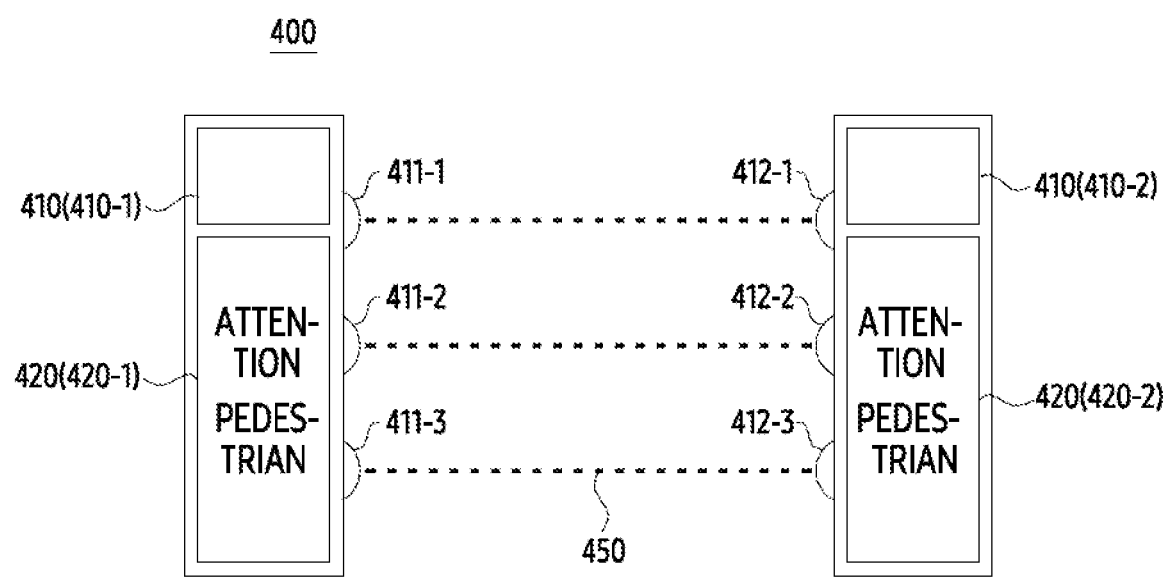
FIG. 4 shows indicating devices including a plurality of light emitting units and a plurality of light receiving units.

FIG. 3 is a flowchart for a signal transmission/reception operation between various devices composing a crosswalk system according to an exemplary embodiment. FIG. 4 shows indicating devices including a plurality of light emitting units and a plurality of light receiving units according to an exemplary embodiment. Further, FIG. 5 shows a schematic view for explaining the operation related to surrounding vehicles in a crosswalk system according to an embodiment.

Figure 5:
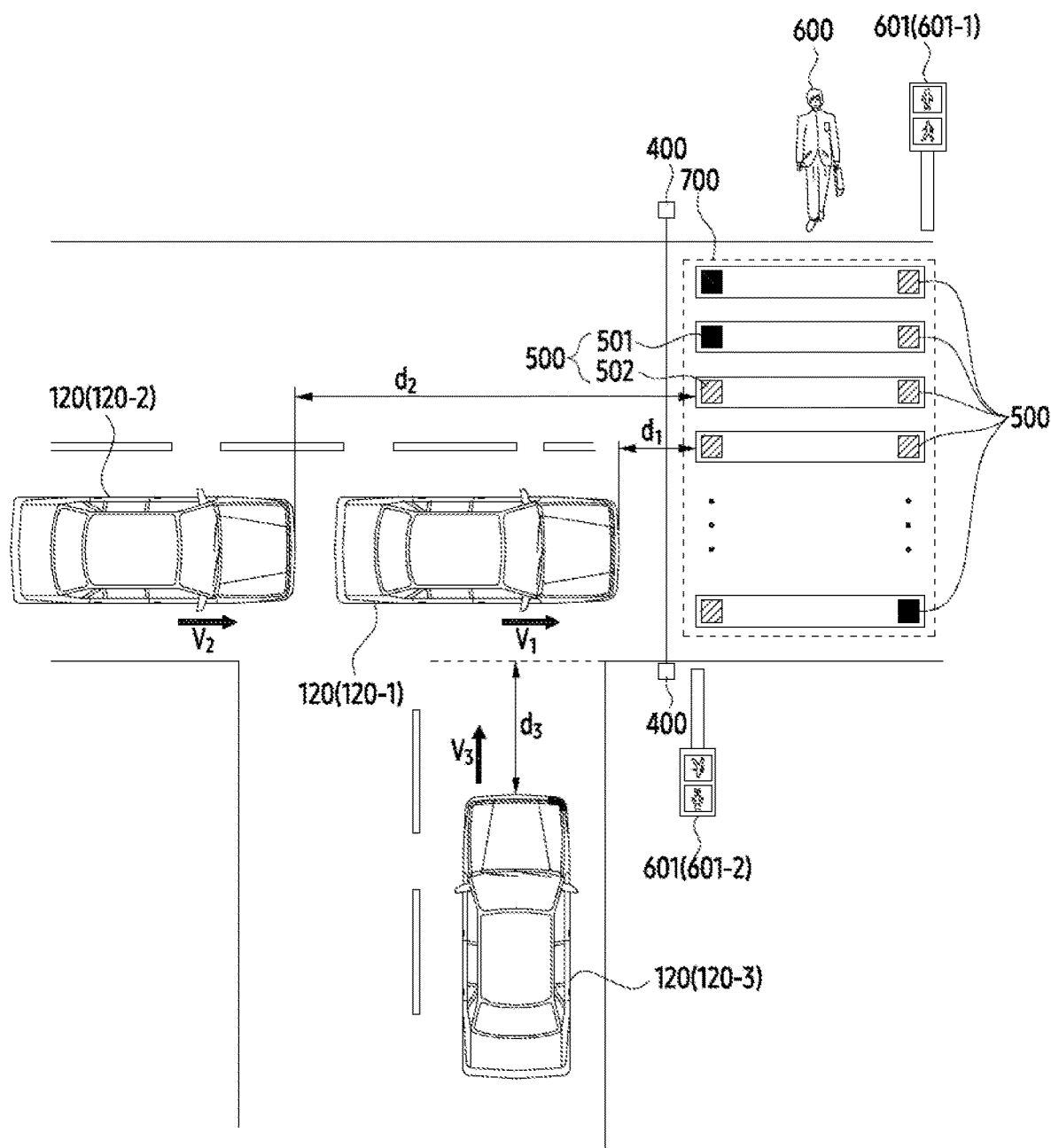
FIG. 5 shows a schematic diagram for explaining the operation of surrounding vehicles travelling in a crosswalk system according to an embodiment.

FIGS. 3 to 5, a crosswalk system 10 (e.g., the crosswalk system 10 of FIG. 1 or 2) may include an electronic device 110 (e.g., the electronic device 110 of FIG. 1 or 2), an external electronic device 125 (e.g., the external electronic device 125 of FIG. 1 or 2), and an indicating device 130 (e.g., the indicating device 130 of FIG. 1 or 2).

According to an embodiment, in an operation 301, the electronic device 110 may detect an external object 600 (e.g., a pedestrian or the external object 600 of FIG. 2). For example, when the electronic device 110 identifies that the traffic lights 601-1 and 601-2 on the crosswalk are turned on in green, through the communication device 111, it may detect a pedestrian occupying or entering the crosswalk, through the sensor 112. According to an embodiment, the operation 301 of detecting the external object 600 may be omitted. For example, when the electronic device 110 identifies that the traffic lights 601-1 and 601-2 on the crosswalk are turned on in green, it may perform an operation 302 to obtain a position of a vehicle 120 (e.g., the vehicle 120 of FIG. 1 or 2) just approaching a predetermined area 700 (e.g., entering the crosswalk).

In the operation 302, when the electronic device 110 detects an external object, it may obtain the position of the vehicle 120 (e.g., the vehicle 120 of FIG. 1 or 2) heading to the predetermined area 700 (e.g., entering the crosswalk). For example, when the electronic device 110 detects the external object and then receives information about the vehicle 120 (e.g., driving information, position information, and/or arrival time information) from the external electronic device 125, it may identify the position of the vehicle 120 based on the received information.

In an operation 303, the electronic device 110 may identify the movement of the vehicle 120 in response to acquiring the position of the vehicle 120. For example, the electronic device 110 may identify the movement of the vehicle 120 by detecting a change in the position of the vehicle 120 through the sensor 112. As another example, the electronic device 110 may identify the movement of the vehicle 120 by identifying a change in the position of the vehicle 120, based on information received from the vehicle 120 through the communication device 111.

In an operation 304, the electronic device 110 may determine a distance between the vehicle 120 and the predetermined area 700 (e.g., a crosswalk), in response to identifying the movement of the vehicle 120. For example, the electronic device 110 may identify position information of the vehicle 120 based on information received from the vehicle 120, and then identify the distance between the vehicle 120 and the predetermined area 700 by comparing the position information of the vehicle 120 with the pre-stored position information of the predetermined area 700.

In an operation 305, the electronic device 110 may transmit a vehicle control signal to the external electronic device 125. For example, when the distance between the vehicle 120 and the predetermined area 700 reaches a first distance $d_1$, as shown in FIG. 5, the electronic device 110 may transmit 700 to the external electronic device 125 the vehicle control signal requesting the vehicle 120-1 approaching the predetermined area 700 (or entering the crosswalk) to stop just before reaching the predetermined area 700. For another example, when the distance between the vehicle 120 and the predetermined area 700 reaches a second distance $d_2$ that is farther than the first distance $d_1$, as shown in FIG. 5, the electronic device 110 may transmit to the external electronic device 125 the vehicle control signal requesting the vehicle 120-2 approaching the predetermined area 700 (or entering the crosswalk) to immediately decelerate. As another example, as shown in FIG. 5, the electronic device 110 may transmit to the external electronic device 125 the vehicle control signal requesting the vehicle 120-3 to decelerate or stop in a situation where the vehicle 120-3 intends to turn right around the crosswalk. According to an embodiment, the electronic device 110 may determine whether the vehicle 120 can be stopped before entering the crosswalk, based on the speed of the vehicle 120. For example, when the distance between the vehicle 120-1 and the predetermined area 700 reaches the first distance $d_1$ and the speed of the vehicle 120-1 reaches the first speed $V_1$, the electronic device 110 may determine whether or not the vehicle 120 can be stopped before entering the predetermined area 700. For example, the electronic device 110 may generate an expected braking time or distance calculated based on the distance $d_1$ between the vehicle 120-1 and the predetermined area 700, the vehicle speed $V_1$, and the deceleration of the vehicle. For another example, the electronic device 110 may determine that the vehicle 120 can be stopped before entering the predetermined area 700, when the distance $d_1$ between the vehicle 120 and the predetermined area 700 reaches the second distance $d_2$ that is farther than the first distance $d_1$, and the vehicle speed reaches the second speed $V_2$. The electronic device 110 may transmit a signal related to a deceleration request to the vehicle 120-2, at the second distance $d_2$. The electronic device 110 may transmit a signal related to a braking request to the vehicle 120-1 located at the first distance $d_1$ closer than the second distance $d_2$.

In an operation 306, the external electronic device 307 may control the speed of the vehicle in response to receiving the vehicle control signal. For example, the external electronic device 125 of the vehicle 120-1 located at the first distance $d_1$ can control braking the vehicle in response to receiving the braking signal. As another example, the external electronic device 125 of the vehicle 120-2 located at the second distance $d_2$ can slow down the speed of the vehicle 120-2 up to the first distance $d_1$ in response to receiving a signal requesting deceleration.

In an operation 307, the electronic device 110 may transmit a signal requesting to display information, to the indicating device 130. For example, the electronic device 110 may transmit to the indicating device 130 a signal requesting outputting of a screen wall that can be identified by the vehicle 120. As another example, the electronic device 110 may transmit to the indicating device 130 a signal requesting displaying of indication information recognizable by a pedestrian, based on information whether or not the vehicle 120 can be stopped and/or the remaining time of the traffic signal status information of the traffic light.

In an operation 308, the indicating device 130 may activate (or provide an indication) the indicating device 130, in response to receiving a signal requesting displaying of information from the electronic device 110. For example, the indicating device 130 may output a screen wall. For another example, the indicating device 130 may control the lighting state of a plurality of indicator lamps installed within the crosswalk.

According to an embodiment, the indicating device 130 may include a first indicator (e.g., the first indicator 400 of FIG. 1 or 2) for outputting a screen wall that can be identified by the vehicle 120, and a second indicator (e.g., the second indicator 500 of FIG. 1 or 2) for outputting indication information recognizable by a pedestrian. The first indicator 400 may provide a screen wall for identification by the right-turning vehicle 120-3, in case where a right-turning vehicle 120-3 fails to detect the external object 600 or recognize the traffic signal status information of the traffic light 601. On this occasion, the external electronic device 125 may set a sudden braking of the vehicle 120-3 based on recognizing the screen wall. The first indicator 400 may provide a screen wall in case where the traffic light outputs a pedestrian signal or it is detected any external object 600 (e.g., a pedestrian) using or entering the crosswalk.

According to an embodiment, as shown in FIG. 4, the first indicator 400 may include a plurality of audio devices 410-1 and 410-2 for outputting auditory information, a plurality of display devices 420-1 and 420-2 for providing a driver of the vehicle 120 with visual information, or one or more of a plurality of light-emitting units 411-1 to 411-3 and a plurality of light receiving units 412-1 to 412-3, for generating a screen wall that can be identified by the vehicle 120-3. At this juncture, the electronic device 110 may transmit a signal requesting deceleration or a signal requesting braking to the vehicle 120-3. The electronic device 110 may determine whether the vehicle 120-3 is decelerated, based on position information of the vehicle. When the vehicle 120-3 is not decelerated, the electronic device 110 may provide a visual warning signal to the external object 600 or the vehicle 120-3, through the plurality of display devices 420-1 and 420-2.

According to an embodiment, the second indicator 500 may include a plurality of LEDs, for example, arranged on the crosswalk, as shown in FIG. 5. The lighting state of the plurality of LEDs may be changed based on at least one of the vehicle 120 entering the predetermined area 700 or the remaining time of the traffic light. For example, some of the plurality of LEDs, located at the position where a pedestrian may walk in safety, may be turned on in green, while other LEDs may be turned on in red.

Although the foregoing description has been made on the premise that the electronic device 110 performs the operation 306 after performing the operation 305, the electronic device 110 according to an embodiment may perform the operations 305 and 306 in parallel or, or following performing the operation 306, the operation 305 may be performed.

As described above, the crosswalk system 10 makes it possible to a pedestrian entering or using a crosswalk into a safer walking zone, by providing the pedestrian with instruction information. Therefore, the crosswalk system 10 can effectively prevent a traffic accident that might be caused by the vehicle 120 entering the crosswalk.

Figure 6:
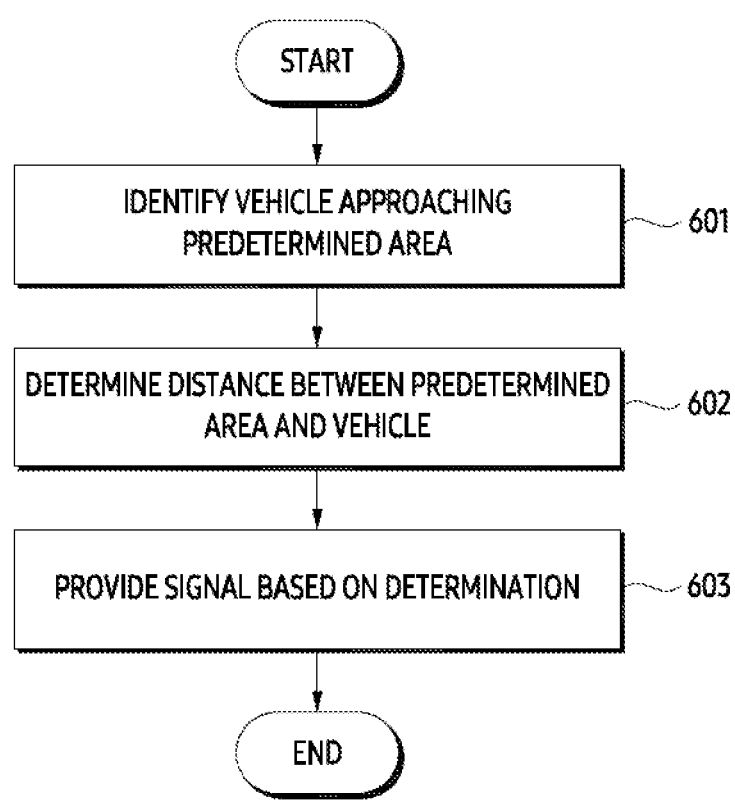
FIG. 6 is a flowchart illustrating a method of providing guide information to a pedestrian using a crosswalk in an electronic device according to an exemplary embodiment.

FIG. 6 is a flowchart illustrating a method for providing guide information to a pedestrian entering or using a crosswalk in an electronic device according to an embodiment.

Referring now to FIG. 6, in an operation 601, the processor (e.g., the processor 114 of FIG. 1) of the electronic device (e.g., the electronic device 110 of FIG. 1, 2, or 3) may identify a vehicle approaching a predetermined area. For example, when the processor 114 detects a pedestrian walking on a crosswalk through the sensor 112, the processor 114 may identify a vehicle approaching the predetermined area 700, based on information received from the vehicle 120 located within a predetermined distance from the predetermined area 700. As another example, when the processor 114 detects a pedestrian walking on a crosswalk through the sensor 112, the processor 114 may identify whether there is a vehicle 120 approaching the predetermined area 700 through the sensor 112. As another example, when the processor 114 identifies that a traffic light is turned on in green based on traffic signal status information received from the traffic light (e.g., traffic lights 601-1 and 601-2 or a pedestrian traffic light), the processor 114 may identify the vehicle approaching the predetermined area, based on information received from the vehicle 120 located at a certain distance from the predetermined area 700. As another example, when the processor 114 identifies that a traffic light is turned on in green based on the traffic signal status information received from the traffic light (e.g., traffic lights 601-1 and 601-2 or a pedestrian traffic light), the processor 114 may identify whether there is a vehicle 120 approaching the predetermined area 700 through the sensor 112.

According to an embodiment, the processor 114 may receive signal information from a traffic light. For example, the processor 114 may receive the signal information from the traffic light through the communication device 111 via wired or wireless communication. According to an embodiment, the signal information may be of traffic signal status information inclusive of information on lighting colors of the traffic light, information on lighting time duration of the traffic light, and/or information on a lighting remaining time of the traffic light. The signal information may include at least part of the traffic signal status information.

In an operation 602, the processor 114 may determine a distance between the predetermined area (e.g., the predetermined area 700 of FIG. 2 or 5) and an external electronic device (e.g., the external electronic device 125 of FIG. 1 or 2). For example, the processor 114 may receive information on the vehicle 120 from the external electronic device 125 mounted on the vehicle 120 approaching the predetermined area 700, through the communication device 111. According to an embodiment, the information on the vehicle 120 may include at least one of driving information, position information, or arrival time information. The processor 114 may determine whether the distance between the predetermined area and the vehicle equipped with the external electronic device is of a stoppable distance, based on the position information, the driving information, and/or arrival time information of the vehicle.

In an operation 603, the processor 114 may transmit a signal to an external electronic device (e.g., the external electronic device 125 of FIG. 1) or an indicating device (e.g., the indicating device 130 of FIG. 1), based on the aforementioned determination. For example, when it is determined that the distance between the predetermined area and the external electronic device is of the stoppable distance by which the vehicle 120 can stop, the processor 114 may transmit a vehicle stop signal to the external electronic device 125. As another example, the processor 114 may transmit a signal requesting forming of a screen wall to a first indicator (e.g., the first indicator 400 of FIG. 1) so as to prevent the vehicle from entering the predetermined area. As another example, the processor 114 may provide a second indicator with a signal to control the lighting state of at least some of the indicator lamps of the second indicator (e.g., the second indicator 500 of FIG. 1), so as to better guide pedestrians into a safer walking zone.

As described above, the electronic device 110 makes it possible to prevent traffic accidents that might occur around a crosswalk, by providing visual information to pedestrians or vehicles entering or approaching the crosswalk, through the indicating device 130, based on the distance between the vehicle 120 and the predetermined area 700.

Figure 7:
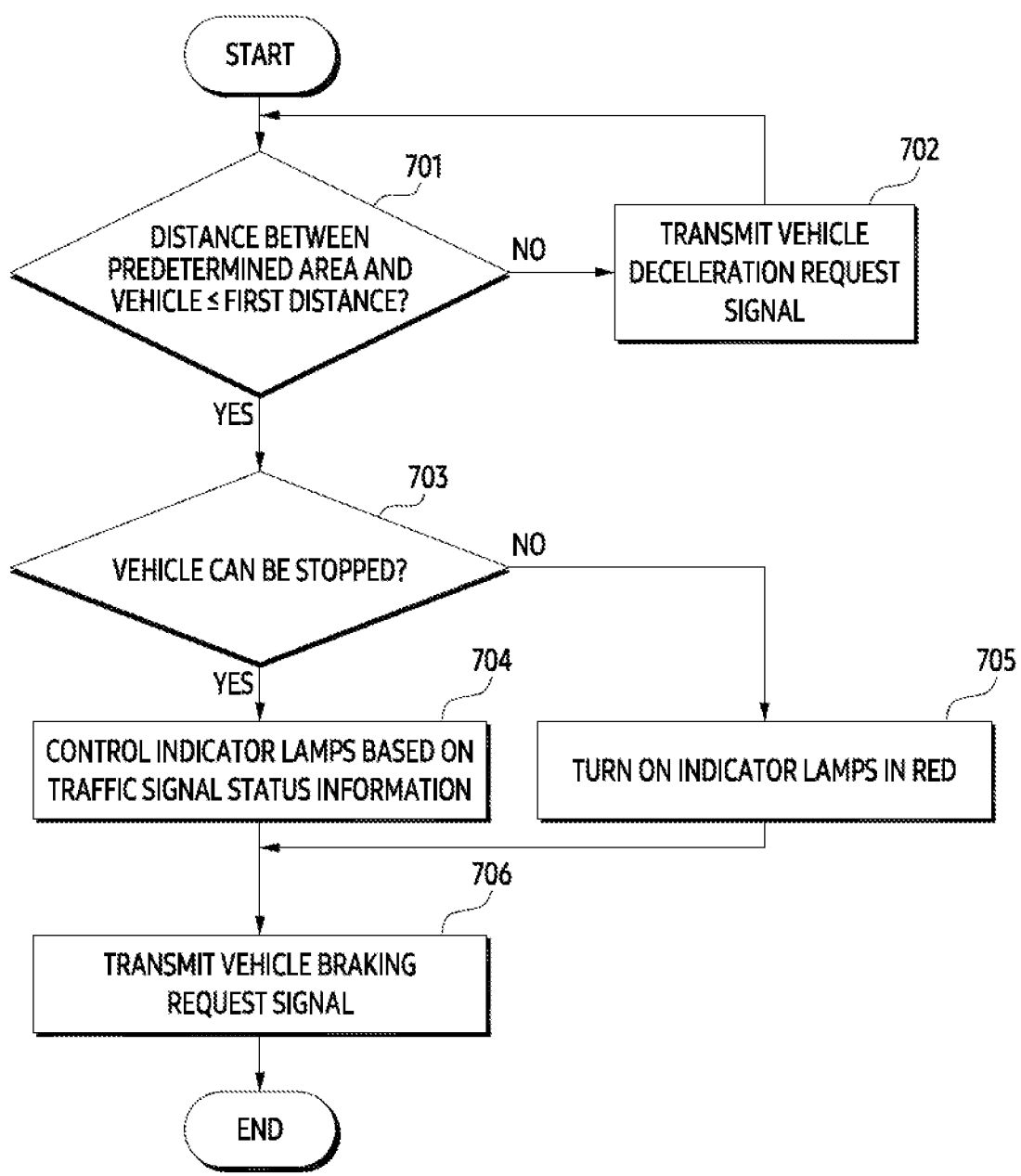
FIG. 7 is a flowchart illustrating a method of providing a control signal to an indicating device and a vehicle in an electronic device according to an exemplary embodiment.

FIG. 7 is a flowchart illustrating a method of providing control signals to an indicating device and/or a vehicle in an electronic device according to an exemplary embodiment.

Referring now to FIG. 7, in an operation 701, a processor (e.g., the processor 114 of FIG. 1) may detect whether a distance between a predetermined area (e.g., the predetermined area 700 of FIG. 2 or 5) and a vehicle (e.g., the vehicle 120 of FIG. 2 or 5) is less than or equal to a first distance (e.g., the first distance $d_1$ of FIG. 5). For example, when the vehicle is travelling within a certain speed range from a predetermined speed limit, the first distance $d_1$ may be a distance within which the vehicle 120 can stop before entering the crosswalk.

In an operation 702, the processor 114 may transmit a deceleration request signal to the vehicle 120, through the communication device 111. For example, when the distance between the vehicle 120 and the predetermined area 700 is greater than or equal to the first distance $d_1$, the processor 114 may transmit the deceleration request signal to the vehicle. The external electronic device 125 of the vehicle 120 may control the vehicle 120 to decelerate in response to receiving the signal. The deceleration request signal may provide deceleration information that cause the vehicle 120 to stop before entering the crosswalk. For example, the processor 114 may generate the deceleration information based on the maximum speed at which the vehicle 120 can be braked before entering the predetermined area 700 at the first distance $d_1$ from the predetermined area 700.

In an operation 703, the processor 114 may determine whether the vehicle 120 can be stopped. For example, when the distance between the vehicle and the predetermined area is less than or equal to the first distance $d_1$, the processor 114 may determine whether the vehicle can be stopped taking into account the speed of the vehicle and the distance between the predetermined area and the vehicle. The processor 114 may calculate a braking distance for the vehicle 120 based on the speed of the vehicle, the distance between the vehicle and the predetermined area, and the deceleration. The processor 114 may then determine whether the vehicle 120 can be stopped by means of comparing the distance between the vehicle 120 and the predetermined area 700, and the calculated braking distance.

In an operation 704, when the vehicle 120 can be stopped before entering the predetermined area 700, the processor 114 may control the indicator lamps within a second indicator 500 (e.g., the second indicator 500 of FIG. 2), based on traffic signal state information of the traffic light. For example, the processor 114 may control the indicator lamps based on the remaining time of the pedestrian signal of the traffic signal status information. As described with reference to FIG. 2, if it is determined that the pedestrian can safely cross the crosswalk, the processor 114 may transmit a control signal to the second indicator 500 so that the indicator lamps corresponding to the safe walking zone are lit in green for the remaining time, while the remaining indicator lamps are lit in red.

In an operation 705, when it is determined that the vehicle 120 cannot stop before entering the predetermined area 700, the processor 114 may then transmit a control signal to the second indicator 500 through the communication device 110 so that the indicator lamps in the second indicator 500 are turned on in red.

In an operation 706, the processor 114 may transmit a braking request signal to the vehicle. For example, the processor 114 may transmit a braking request signal for the vehicle, based on identifying that the vehicle has entered a position within the first distance from the predetermined area, so as to deliver a signal for braking the vehicle just before entering the predetermined area.

As described above, the processor 114 of the electronic device 110 can provide a pedestrian with indication information on whether or not it is possible for a pedestrian to safely cross the crosswalk at the current position on the crosswalk, with the execution of the operations 704 and 705. Further, the inventive crosswalk system 10 makes it possible for the users or pedestrians of the crosswalk to identify whether they can safely cross the crosswalk cross at the current position, based on the lighting color of the plurality of indicator lamps arranged on the floor of the crosswalk, thereby enabling the users or pedestrians to intuitively recognize safety in crossing the crosswalk within the remaining time of the traffic light.

Figure 8:
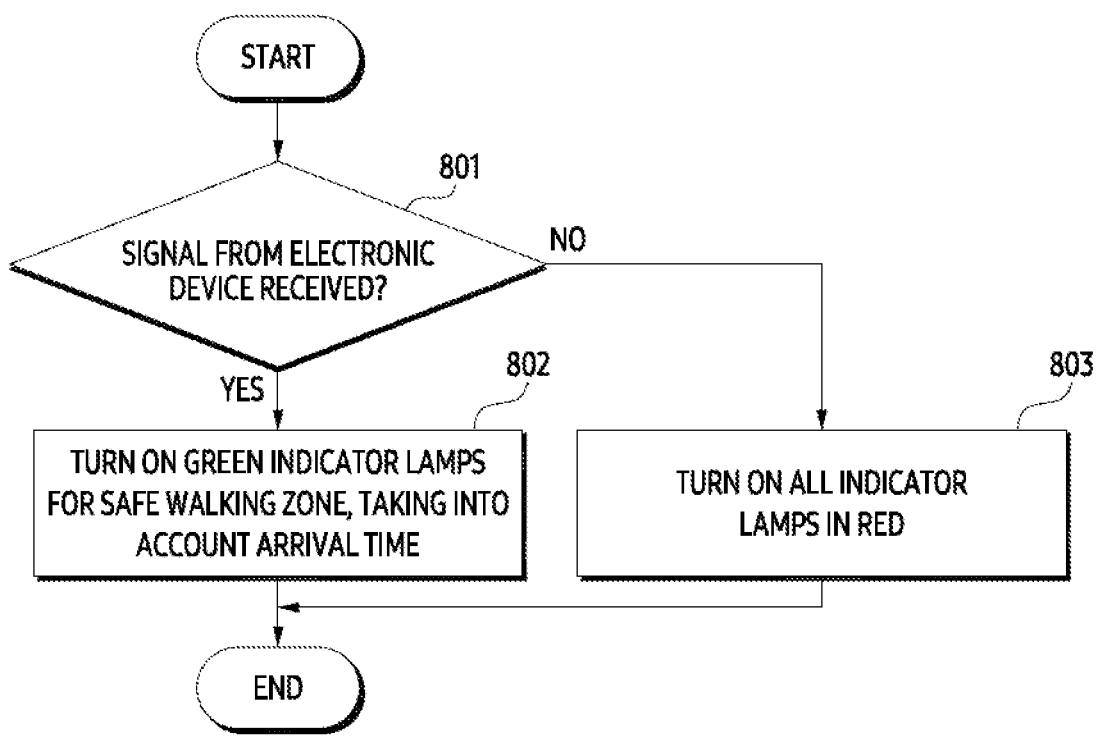
FIG. 8 is a flowchart illustrating a method of controlling indicator lamps in an indicating device according to an embodiment.

FIG. 8 is a flowchart for explaining a method of controlling indicator lamps in an indicating device according to an embodiment.

Referring now to FIG. 8, in an operation 801, the indicating device 130 may receive a signal from the electronic device 110. The electronic device 110 may generate a control signal of the indicating device 130, based on driving information of the vehicle, position information, arrival time information, traffic signal status information of a traffic light, and/or a combination thereof. The electronic device 110 may transmit the control signal of the indicating device 130 to the indicating device 130.

In case where the vehicle can be stably braked before entering the predetermined area, the signal received from the electronic device 110 may include a signal to identify indicator lamps to be displayed in green among the indicator lamps so as to provide the pedestrians with information for their safety on the crosswalk, based on the traffic signal status information of the traffic light. For example, the signal received from the electronic device 110 may include a signal to identify indicator lamps to be lit in green for at least some of the plurality of indicator lamps, based on the remaining time of the traffic light of the traffic signal status information, and a signal to identify indicator lamps to be lit in red for the remaining ones, in order to guide the users into a safer walking zone. For example, an area with indicator lamps providing green light may be of a safe walking zone, while an area with indicator lamps providing red light may be of a non-safe walking zone.

In an operation 802, when receiving from the electronic device 110 a signal indicating that the vehicle 120 can be stopped, the indicating device 130 may turn on in green the indictor lamps corresponding to a safe walking zone, taking into account the arrival time of the vehicle 120. For example, based on the arrival time of the vehicle 120 received from the electronic device 110, the indicator lamps corresponding to the safe walking zone may be turned on in green. As time goes by, the indicating device 130 may control some of the indicator lamps lit in green to be lit in red. According to an embodiment, the indicating device 130 may indicate decreased walkable distance as the vehicle 120 more closely approaches over time. For example, if the time required for the vehicle 120 to get to the crosswalk is longer than a predetermined time period or the vehicle 120 can be stably or safely stopped, then the indicating device 130 may turn on all the indicator lamps in green. As the time for the vehicle 120 to get to the crosswalk decreases, the indicator lamps may be sequentially turned on in red along the pedestrian's walking direction.

In an operation 803, when receiving a signal from the electronic device 110 indicating that the vehicle 120 cannot be stopped, the indicating device 130 may turn on all indicator lamps in red. For example, if it is determined that the vehicle 120 cannot stop before reaching the predetermined area, then the indicating device 130 may turn on all those indicator lamps in red to inform the pedestrians that it is now a dangerous situation to cross the crosswalk. The indicating device 130 may provide a visual warning signal informing that a vehicle is approaching a crosswalk, by turning on all the indicator lamps in red and blinking them at a predetermined period or by periodically changing the intensity of light emitted from the indicator lamps at a predetermined period as well.

Figure 9:
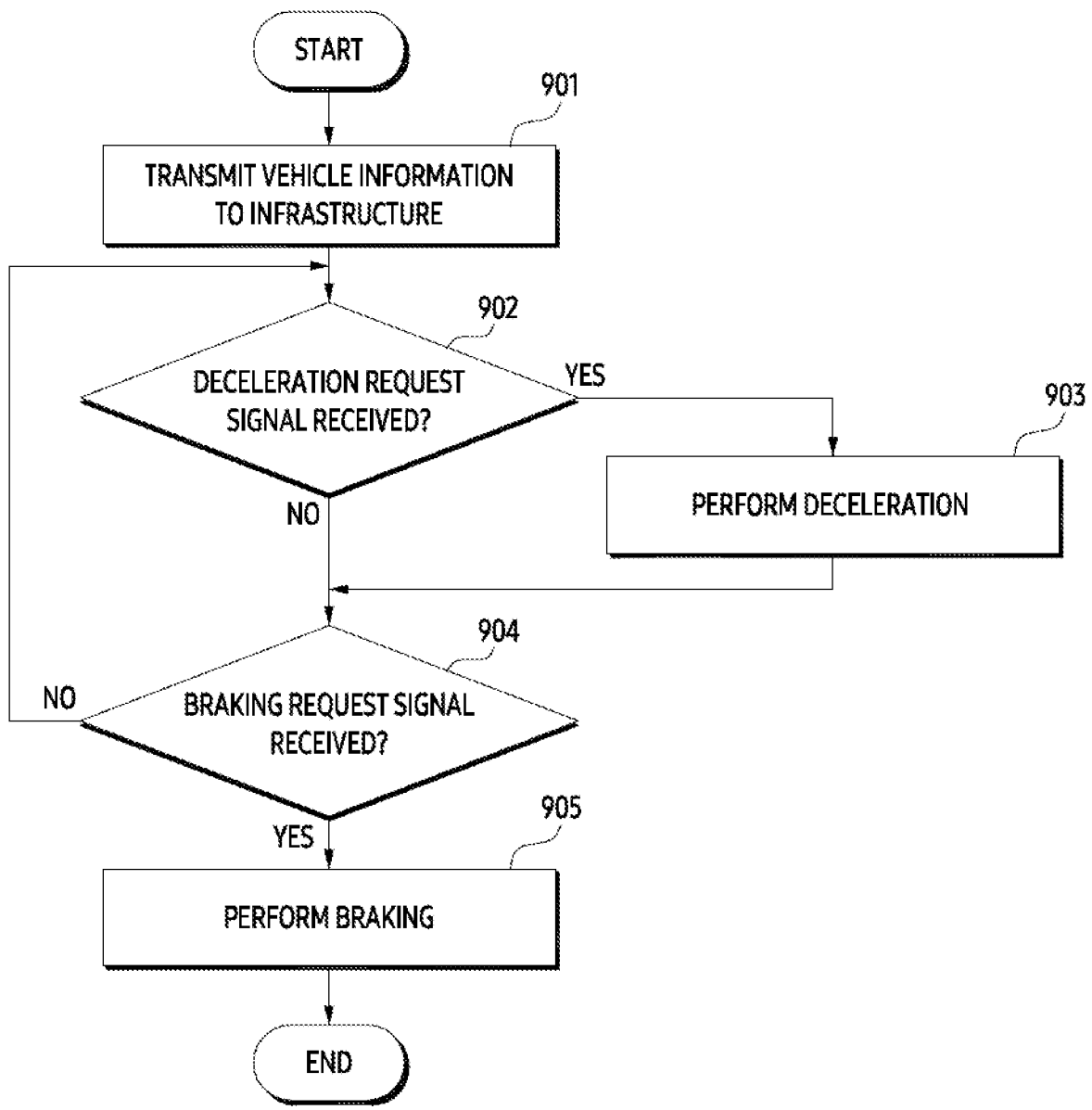
FIG. 9 is a flowchart illustrating a method of controlling an external electronic device mounted on a vehicle according to an exemplary embodiment.

FIG. 9 is a flowchart illustrating a method of controlling an external electronic device mounted on a vehicle according to an exemplary embodiment.

In an operation 901, a processor (e.g., the processor 129 of FIG. 1) of an external electronic device (e.g., the external electronic device 125 of FIG. 1) mounted in a vehicle (e.g., the vehicle 120 of FIG. 1)) may transmit vehicle information to an electronic device included in the infrastructure 100 (e.g., the electronic device 110 of FIG. 1), through the communication device 126. For example, the external electronic device 125 may transmit to the electronic device 110 vehicle driving information, position information, arrival time information, and/or a combination thereof.

In an operation 902, the processor 129 may receive a deceleration request signal of the vehicle from the electronic device 110. For example, the deceleration request signal may be of a signal to request deceleration of the vehicle speed to a level lower than a predetermined speed, before the vehicle reaches the first distance, by make a determination of the electronic device 110, based on the vehicle driving information, position information, arrival time information, and/or a combination thereof. The deceleration request signal received from the electronic device 110 may include a deceleration calculated taking into account the distance between the predetermined area and the vehicle. The processor 129 may not receive such a deceleration request signal, in case where the speed of the vehicle is equal to or less than the predetermined speed.

In an operation 903, in response to receiving the deceleration request signal, the processor 129 may control the vehicle to decelerate to a predetermined speed or less. The processor 129 may control a driving system of the vehicle based on the received deceleration, to decelerate the vehicle speed.

In an operation 904, the processor 129 may receive a stop request signal from the electronic device 110. For example, when the vehicle 120 enters within the first distance from the predetermined area, the processor 129 may receive the stop request signal from the electronic device.

In an operation 905, the processor 129 may control to perform a stop operation of the vehicle, in response to receiving the stop request signal from the electronic device 110. For example, when the vehicle reaches a position within the first distance from the predetermined area, the processor 129 may control the driving system of the vehicle to brake the vehicle. As such, the processor 129 can cause the vehicle to be braked before the vehicle reaches the predetermined area.

As described above, the vehicle 120 can be stopped before reaching the crosswalk, by performing the deceleration operation and the braking operation based on the deceleration request signal received from the electronic device 110, so as to prevent traffic accidents with pedestrians using crosswalks.

According to various embodiments, the crosswalk system (e.g., the crosswalk system of FIG. 1) may comprise an infrastructure (e.g., the infrastructure 100 of FIG. 1) including a communication device (e.g., the communication device 111 of FIG. 1), a vehicle (e.g., the vehicle 120 of FIG. 1) communicating with the infrastructure, and an indicating device electrically connected to the infrastructure (e.g., the indicating device 130 of FIG. 1), wherein the infrastructure may be configured to detect an external object within a predetermined area through at least one sensor (e.g., the sensor 112 of FIG. 1), obtain a position of the vehicle through the communication device, and transmit to the indicating device a signal requesting the vehicle to provide information related to whether it is possible to cross the predetermined area from the vehicle, based on the detected external object and the obtained position of the vehicle.

According to an embodiment, the indicating device may include a plurality of light emitting units (e.g., a plurality of light emitting units 411-1, 411-2 and 411-3 of FIG. 4) disposed at one end of at least one edge of the predetermined area, and a plurality of light receiving units (e.g., a plurality of light receiving units 412-1, 412-2 and 412-3 of FIG. 4) disposed at the other end of the at least one edge of the predetermined area, wherein the plurality of the light emitting units may provide visual information to the external object or the vehicle.

According to an embodiment, the infrastructure structure may be configured to identify a movement of the vehicle approaching the predetermined area based on the obtained position of the vehicle, determine whether a distance between the vehicle and one end of the predetermined area is equal to or less than a first distance, based on the identification, and provide a signal to request emitting of light to the plurality of light emitting units, based on the determination.

According to an embodiment, the indicating device may include a plurality of indicator lamps arranged on a bottom surface of the predetermined area, wherein the plurality of indicator lamps may provide visual information to the external object.

According to an embodiment, the infrastructure may include at least one traffic light located in the predetermined area, wherein the infrastructure may be configured to be electrically connected to the traffic light, receive a pedestrian signal provided by the traffic light, identify the movement of the vehicle approaching the predetermined area based on the obtained position of the vehicle, and transmit to the indicating device a signal to request providing a designated lighting color to each of the plurality of indicator lamps, based on the received signal and the movement of the vehicle.

According to an embodiment, the indicating device may be configured to turn on all indicator lamps in red when the vehicle is located within a first distance from one end of the predetermined area and the vehicle cannot be stopped before entering the predetermined area, and turn on some of the indicator lamps in green and turn on the remaining ones in red, based on traffic signal status information received from the infrastructure, in case where the vehicle can be stopped before entering the predetermined area.

According to an embodiment, the infrastructure structure may be configured to determine whether a distance between the vehicle and one end of the predetermined area is equal to or greater than a first distance based on the obtained position of the vehicle, and transmit to the vehicle a signal to request deceleration for the vehicle, based on the determination, through the communication device.

According to an embodiment, the indicating device may include a display device (e.g., the display device 420 of FIG.

4) and an audio device (e.g., the audio device 410 of FIG. 4), and the infrastructure may be configured to transmit a deceleration request signal to determine whether the vehicle has been decelerated or not, and provide a visual or audible warning signal to the external object through the indicating device, based on the determination of whether the vehicle has been decelerated.

According to an embodiment, the indicating device may control at least one light emitting unit located in the predetermined area based on the signal, in response to receiving the signal from the infrastructure, so as to provide information to guide whether the external object can completely pass the predetermined area.

According to an embodiment, the vehicle may include a plurality of sensors for detecting the external object and a display device installed on a front of the vehicle (e.g., the display device 127 of FIG. 2), wherein the display device may display information related to detection of the external object, based on the detection of the external object through the plurality of sensors, and the infrastructure may identify whether a signal related to the detection of the external object is received, based on the detection of the external object and the position of the vehicle, and provide a visual or audible alarm to the external object or the vehicle through the indicating device, based on the identification.

According to an embodiment, an electronic device (e.g., the electronic device 110 of FIG. 1) may include a communication device (e.g., the communication device 111 of FIG. 1), at least one memory configured to store a plurality of instructions (e.g., the memory 113 of FIG. 1), at least one sensor for detecting an external object (e.g., the sensor 112 of FIG. 1), and at least one processor (e.g., the processor 114 of FIG. 1) operatively coupled to the communication device, the memory, and the at least one sensor, wherein the at least one processor, when the instructions are executed, may be configured to receive information from a vehicle entering a predetermined area (e.g., the vehicle 120 of FIG. 2), through the communication device, while a traffic light disposed in the predetermined area including a crosswalk (e.g., the predetermined area 700 of FIG. 2) outputs a pedestrian signal, identify a distance between the predetermined area and the vehicle, based on the information, transmit to the vehicle a vehicle control signal for controlling the driving condition of the vehicle through the communication device, based on the identified distance, and transmit a control signal to an indicating device disposed in the crosswalk, via the communication device, so that the vehicle and the users using the crosswalk are provided with indication information, based on the identified distance.

According to an embodiment, the information of the vehicle entering the predetermined area may include position information of the vehicle obtained through the communication device.

According to an embodiment, the at least one processor may be configured to, when the instructions are executed, transmit a vehicle deceleration request signal if the identified distance is equal to or greater than a first distance, and transmit a vehicle braking request signal if the identified distance is less than the first distance.

According to an embodiment, the indicating device may include a plurality of light emitting units (e.g., a plurality of light emitting units 411-1, 411-2, and 411-3 of FIG. 4) disposed at one end of at least one edge of the determined area, and a plurality of light receiving units disposed at the other end of the at least one edge (e.g., a plurality of light receiving units 412-1, 412-2, and 412-3 of FIG. 4), wherein the at least one processor may be configured to, when the instructions are executed, determine whether a distance between the vehicle and one end of the predetermined area is less than or equal to a first distance based on the identified distance, and based on the determination, request the indicating device to output light from the plurality of light emitting units to provide visual information to the external object or the vehicle.

According to an embodiment, the indicating device may include a plurality of indicator lamps arranged on a floor surface of the predetermined area, and the at least one processor may be configured to, when the instructions are executed, identify the movement of the vehicle approaching the predetermined area, based on the obtained position of the vehicle, receive traffic signal status information from a traffic light, and transmit to the indicating device a signal to request providing a designated color to each of the plurality of indicator lamps, based on the received traffic signal status information and the movement of the vehicle.

Methods according to various embodiments described in the specification and claims of the present disclosure may be implemented in the form of hardware, software, or a combination of hardware and software. In the specific embodiments of the present disclosure described above, elements included in the disclosure may be expressed in a singular or plural form according to the specific embodiments disclosed therein. However, such a singular or plural form of expressions may be appropriately selected to better suit to the context presented for convenience of description, and the present disclosure is not limited to the specific singular or plural element. Although any element or component is expressed in a plural form, it may consist of a single element or component, and vice versa.

Further, the embodiments of the present invention described in the present disclosure are merely provided for certain examples in order to easily explain the technical contents according to the embodiments of the present invention and help a reader better understand the embodiments of the present invention, and it is not intended to limit the scope of the embodiments disclosed therein. Therefore, it should be understood that the scope of various embodiments of the present invention encompass, in addition to the embodiments disclosed herein, all changes or modifications derived from the technical ideas of various embodiments of the present invention.

What is claimed is:

1. A crosswalk system, comprising:
   an infrastructure including a communication device;
   a vehicle communicating with the infrastructure; and
   an indicating device electrically connected to the infrastructure;
   wherein the infrastructure is configured to:
      detect an external object in a predetermined area through at least one sensor;
      obtain a position of the vehicle through the communication device; and
      based on the detected external object and the obtained position of the vehicle, transmit to the indicating device a signal requesting the vehicle to provide information related to whether it is possible to pass the predetermined area.

2. The crosswalk system according to claim 1, wherein the indicating device includes a plurality of light emitting units disposed at one end of at least one edge of the predetermined area, and a plurality of light receiving units disposed at the other end of the at least one edge of the predetermined area, and the plurality of the light emitting units provide visual information to the external object or the vehicle.

3. The crosswalk system according to claim 2, wherein the infrastructure structure is configured to:
identify a movement of the vehicle approaching the predetermined area, based on the obtained position of the vehicle,
determine whether a distance between the vehicle and one end of the predetermined area is equal to or less than a first distance, based on the identification, and
provide a signal to request emitting of light to the plurality of light emitting units, based on the determination.

4. The crosswalk system according to claim 1, wherein the indicating device includes a plurality of indicator lamps arranged on a bottom surface of the predetermined area, and the plurality of indicator lamps provide visual information to the external object.

5. The crosswalk system according to claim 4, wherein the infrastructure includes at least one traffic light located in the predetermined area, and the infrastructure is configured to:
be electrically connected to the traffic light,
receive a pedestrian signal provided by the traffic light,
identify the movement of the vehicle approaching the predetermined area, based on the obtained position of the vehicle, and
transmit to the indicating device a signal to request providing a designated lighting color to each of the plurality of indicator lamps, based on the received signal and the movement of the vehicle.

6. The crosswalk system according to claim 5, wherein the indicating device is configured to:
turn on all the indicator lamps in red, in case where the vehicle is located within a first distance from one end of the predetermined area and the vehicle cannot be stopped before entering the predetermined area, and
turn on some of the indicator lamps in green and turn on the remaining ones in red, based on traffic signal status information received from the infrastructure, in case where the vehicle can be stopped before entering the predetermined area.

7. The crosswalk system according to claim 2, wherein the infrastructure structure is configured to:
determine whether a distance between the vehicle and one end of the predetermined area is equal to or greater than a first distance, based on the obtained position of the vehicle, and
transmit to the vehicle a signal to request deceleration for the vehicle, through the communication device, based on the determination.

8. The crosswalk system according to claim 7, wherein the indicating device includes a display device and an audio device, and the infrastructure is configured to:
transmit a deceleration request signal to determine whether the vehicle has been decelerated, and
provide a visual or auditory warning signal to the external object through the indicating device, based on the determination as to whether the vehicle has been decelerated.

9. The crosswalk system according to claim 1, wherein the indicating device is configured to control at least one light emitting unit located in the predetermined area based on the signal, in response to receiving the signal from the infrastructure, so as to provide information to guide whether the external object can completely traverse the predetermined area.

10. The crosswalk system according to claim 1, wherein the vehicle includes a plurality of sensors to detect the external object and a display device installed on a front of the vehicle, and displays information related to detection of the external object, based on detection of the external object through the plurality of sensors, and
wherein the infrastructure is configured to:
identify whether a signal related to the detection of the external object is received, based on the detection of the external object and the position of the vehicle, and
provide a visual or auditory alarm to the external object or the vehicle through the indicating device, based on the identification.

* * * * *